March 30, 1954  W. G. SCHARMANN  2,673,456
SEPARATION OF LOW BOILING GAS MIXTURES
Filed June 16, 1949  2 Sheets-Sheet 2
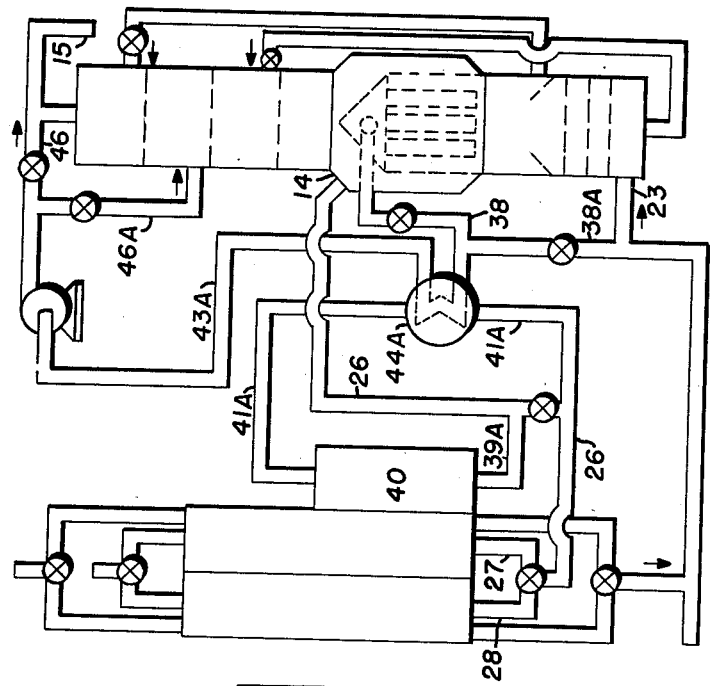
FIGURE-IV
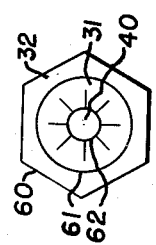
FIGURE-II
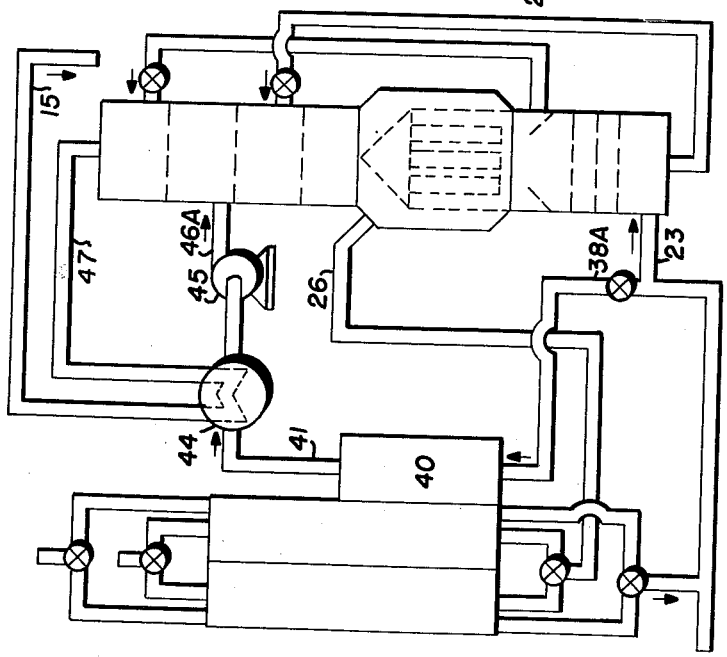
FIGURE-III
Walter G. Scharmann (Deceased) Inventor
By Louie Randall Scharmann Executrix
By J. Cashman Attorney Patented Mar. 30, 1954

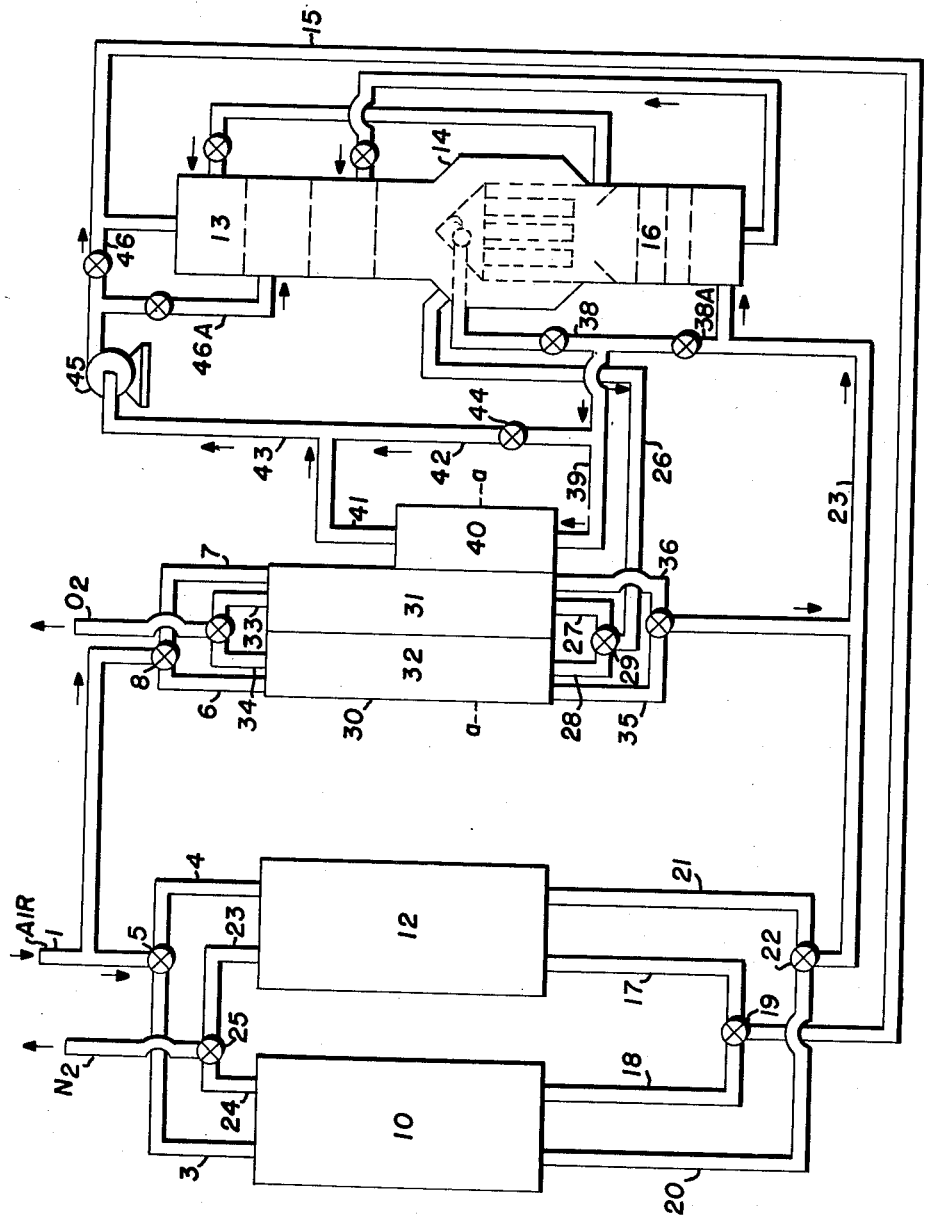

2,673,456

UNITED STATES PATENT OFFICE 2,673,456

SEPARATION OF LOW BOILING GAS MIXTURES

Walter G. Scharmann, Westfield, N. J., assignor to Standard Oil Development Company, a corporation of Delaware Application June 16, 1949, Serial No. 99,426

14 Claims. (Cl. 62—175.5)

The present invention relates to a process for separating gas mixtures containing constituents of different boiling points and to the removal from such gas mixtures of constituents which tend to solidify at the conditions of the separation process. More particularly, the invention is concerned with the separation of air into nitrogen and oxygen involving the removal of water and $CO_2$ by solidification and vaporization during the process.

The separation of gas mixtures containing low boiling constituents, such as air, into their principal components by conventional low temperature liquefaction methods involves as one of its major difficulties the deposition of ice, solid carbon dioxide or other comparatively high freezing point minor gas constituents in the countercurrent regenerative type heat exchangers which have been hitherto used to cool the incoming air to temperatures suitable for subsequent fractionation into its principal components. The deposits of frozen water and carbon dioxide very rapidly plug up the gas passages of the regenerators which have to be thawed out after relatively short operating periods even if the gas mixtures have been previously purified by suitable chemical treatments. For this purpose switching regenerators have been used which are kept in operating condition by the periodic revaporization of deposited ice and $CO_2$ snow into low pressure streams of oxygen and nitrogen produced in the process itself and passed during the cold storage cycle through those passages of the regenerators through which, in a previous air cooling cycle, the air had been passed depositing its water and $CO_2$ in solid form. In this manner, the ice and solid $CO_2$ evaporate into the low presure product streams while simultaneously the cold end of the regenerator is cooled down to a temperature closely approaching that of the product streams to become useful for the chilling of the air to operating temperatures in the next cycle.

Since the refrigeration requirements of the process represent, basically, the heat leak into the system and the difference in heat content between the entering air and the product $O_2$ and $N_2$ streams leaving, it is essential, for economical operation, that heat leak be maintained as low as possible by means of insulation and that the temperature difference (warm end temperature difference) between the incoming air and outgoing product streams be as small as economically possible, to reduce heat loss and hence refrigeration requirements for this point in the system.

In order to permit the removal of ice and solid $CO_2$ from the alternating regenerators in the manner indicated, a larger quantity of cold low pressure product gas must be passed over the surfaces containing ice and $CO_2$, than the quantity of air from which the ice and $CO_2$ to be removed was previously deposited.

This is due to the fact that the low pressure product gases have a smaller heat capacity than the higher pressure air from which the solid impurities are deposited. For example, if the amount of product gas were equal to the high pressure air, with which heat is exchanged, and if a small warm end temperature difference of say 5° F. were obtained in the regenerators, then the difference in temperature of the air and product gas streams at the cold end of the regenerator would have to be about 25° F. It is desirable to reduce the air temperature to a point merely approaching its dew point at the cold end of the exchanger and the product streams would be 25° F. lower in temperature than this air temperature. At this low temperature, or relatively large differential temperature, the product gases do not have sufficient carrying capacity to remove the frozen deposits. To make possible the use of higher cold products temperatures and so to reduce the temperature differential and thereby obtain sufficient carrying capacity for frozen solids, the total heat capacity of the product streams is increased by increasing the quantity of these materials above that represented by the incoming air. This procedure for placing the product stream in proper condition to remove solids has generally been referred to as establishing exchanger "unbalance." Various methods have been proposed and used heretofore to accomplish this unbalance and with it an efficient operation of the regenerators or other types of heat exchangers for chilling the incoming air to fractionation temperatures.

One of the methods, used to achieve unbalance, involves by-passing a small proportion (of the order of 3–6%) of the total air stream around the regenerators. The by-pass stream is compressed to high pressure (150–200 atms.), chemically purified to remove $CO_2$ and is then cooled by heat exchange, for example, with gaseous $N_2$ withdrawn from the top of the high pressure (5–6 atms.) tower of the conventional double tower fractionating system. In some cases auxiliary refrigeration of this by-pass stream has been employed by means of an ammonia refrigeration system. The low temperature by-pass stream is reduced from its high pressure level through throttling valves and enters the high pressure tower, mentioned above, together with air from the main regenerator exchangers. Both streams are processed together and hence the products made are greater in quantity than the air passed through the regenerator exchangers, thereby establishing the unbalance previously considered.

One of the most efficient cold regenerators used for this type of operation is the so-called "ribbon packed" type of cold regenerator. The cold storage medium in these regenerators is made by simultaneously winding two corrugated aluminum strips (about 25 mm. wide and 0.5 mm. thick) with the corrugations at right angles to each other into a coil in a manner similar to the winding of a movie reel. A series of these coils commonly called "pancakes" are placed on top of each other in the regenerator vessel. Duplicate alternating regenerators are used for heat exchange of incoming air with product nitrogen on the one hand and of incoming air with product oxygen on the other hand. The incoming air and product gas streams are switched from one to the other regenerators at approximately 3 minute intervals. Regenerators of this type combine high efficiency of heat exchange at low operating cost because of low pressure drop requirements with relatively low manufacturing and maintenance cost. However, the by-pass air stream required to establish the unbalance discussed above represents a substantial item of investment and operating cost because of its high pressure level and the need for separate chilling and chemical purification facilities for this stream, as by scrubbing with NaOH solution. Carbon dioxide cannot be removed easily from the high pressure by-pass air by chilling, since the air liquefies before the $CO_2$ is deposited on the chilling surface. Various attempts have been made, therefore, to eliminate this stream, utilizing concepts and techniques which have developed during the last five years.

In general, the trend of these efforts has been toward the development of a completely low pressure (i. e., 5–7 atms.) process, in which the unbalance required for satisfactory vaporization of the $CO_2$ and $H_2O$ deposited on chilling the incoming air is obtained not by the expedient of by-passing a small portion of the entering air around the regenerators and separately chilling and purifying this stream, but rather by recycling a small cold gas stream (air or products) through suitable passages in the regenerator in thermal contact with the air stream being cooled. The by-pass air stream is thus completely eliminated, the air previously introduced in this manner being included in the main air stream entering the process.

The prospects of accomplishing such a completely low pressure process have been considerably improved by the recent development of more efficient gas expansion turbines and of process flow schemes allowing the expansion of a larger quantity of gas than has been the case in previous operations. This permits the generation of the necessary refrigeration for the process entirely by means of the work-expansion of a process gas stream, and it is no longer necessary to compress a small portion of the incoming air to high pressure levels and to provide for auxiliary refrigeration and purification of this stream.

While the use of low pressures throughout is a desirable development both technically and economically, the provision of a separate flow path, for internally recycling an unbalance gas stream, which is thermally bonded to the flow path for the incoming air stream, is not completely satisfactory from an economic point of view. It is this feature however which permits the elimination of the requirement for introducing a small portion of the inlet air through a separate flow path which by-passes the regenerators and therefore requires separate purification and chilling facilities.

The scheme of unbalancing by recycle of gas through a separate flow path which is thermally bonded to the main flow path may be applied to heat exchange means using either the regenerative or the continuous recuperative scheme of heat transfer, but in all cases a very substantial increase in cost of the principal heat exchange means relative to the conventional simple packed type regenerators is encountered.

In the case of regenerators designed to include separate flow paths for recycle unbalance, the increased cost results from the special form of surface employed and the cost of installing this surface together with the limited cross-sectional area across which the effect of the unbalance flow can be made effective. It is necessary to design such regenerator units even for large air separation plants in the form of a large number of chambers of limited diameter (e. g. less than 1½ ft.) arranged for parallel flow of the gas streams therethrough, whereas by constructing a regenerator unit using by-pass unbalance rather than recycle unbalance, the regenerators can be greatly increased in diameter (e. g. to 12 ft.) with a corresponding saving in cost of shells, valves, headers, insulation, etc.

In the case of heat transfer means using the recuperative principle, usually termed simply reversing heat exchangers, methods have been devised permitting these to be constructed with provision for recycle unbalanced flow passages for minor amounts of gas. Some of these exchangers are of the multiple double-pipe type with a high degree of surface multiplication due to the use of finned discs. Other modifications, the so-called flat-plate type, employ extended surfaces in a series of rectangular sections formed by internal parallel spaced plates running lengthwise through the exchanger. All these exchangers will hereinafter be referred to as "extended surface" exchangers.

The passages in the low temperature section of such an exchanger, in which $CO_2$ and ice deposition take place contain unbalance passages through which a minor auxiliary recycle stream of cold gas is passed continuously. This serves to adjust the temperature difference of the two main streams as required to insure complete vaporization of deposited $CO_2$ by the product stream. This arrangement not only provides the desired heat balance with a close temperature approach at the warm end but also permits control of the lowest temperature conditions so that essentially all contaminants are removed from the air stream and revaporized by the returning product stream when the air and product gas streams are switched within the exchangers. However, in order to duplicate the heat exchange and pressure drop characteristics of the "ribbon packed" regenerators in the extended surface exchangers, a considerably higher manufacturing cost is incurred.

It follows from the above that the ribbon packed regenerator has the advantage of lower costs and the possibility of using large vessels which may be arranged more compactly so as to reduce insulation cost, piping and refrigeration requirement. The disadvantage of the ribbon packed regenerators lies in the requirement of the relatively expensive by-pass stream. The extended surface-type exchanger has the advantage of eliminating this external stream. However, it is much more expensive than the ribbon packed regenerator and involves considerably more piping and insulation to reduce heat losses to the same degree. It has now been found that these two types of heat exchangers may be used together in such a manner that full advantage is taken of their desirable features while most of their disadvantages are avoided.

In normal operation involving extended surface-type exchangers, the air stream passing through the exchanger is equal in amount to the returning product stream and the device provides only its own unbalance. In accordance with the present invention however, an extended surface exchanger is so operated that it provides, additionally, the unbalance required in a ribbon packed regenerator which is arranged to cooperate with the extended surface exchanger. For this purpose unequal streams of air and returning product gas are passed through both the ribbon packed regenerator and the extended surface exchanger, in such a manner that the product gas stream exceeds the feed air stream in the ribbon packed regenerator while the feed air stream exceeds the product gas stream in the extended surface exchanger. The excess of the net feed air stream exclusive of the usual reversing losses over the product gas stream in the extended surface exchanger may be about 5–15%. Thus, not only the relatively expensive external by-pass stream normally required in connection with ribbon packed regenerators is eliminated but the more expensive extended surface exchangers are to a large extent replaced by the cheaper ribbon packed regenerators.

In accordance with a preferred embodiment of the invention, duplicate alternating ribbon packed regenerators are provided for about 75–80%, preferably about 78%, of the air to be treated and these ribbon packed regenerators are combined with an internally unbalanced, switching, extended surface exchanger, which serves the chilling of the remaining 20–25%, preferably about 22%, of the incoming air. In this manner the total product nitrogen stream may be used to chill a slightly smaller quantity of air in the ribbon packed regenerators and the product oxygen stream may be used to chill the air in the extended surface exchanger which provides the unbalance of the system. It is also within the spirit of the present invention to use product nitrogen rather than product oxygen in the extended surface exchanger. In its broadest aspect, the invention involves treating about 20–25% of the total air feed in an extended surface exchanger equipped with internal unbalance and the remainder in ribbon packed regenerators, with suitable product gas streams.

Having set forth its objects and general nature, the invention will be best understood from the following more detailed description wherein reference will be made to the accompanying drawing, the figures of which illustrate schematically a basic system in Figure I, and certain modifications in Figures II, III, and IV, particularly suitable for the purpose of the invention.

Referring now to Figure I of the drawings, the system illustrated therein essentially comprises a set of duplicate alternating ribbon packed cold regenerators 10 and 12 and a switching, extended surface exchanger 30 provided with an internal unbalance conduit. The function and cooperation of these elements will be forthwith described using the separation of 100 mols of air into nitrogen and oxygen as an example. Considerable conventional equipment required in a complete air fractionation system has been omitted for the purpose of simplicity. Equipment omitted may include such elements as means for cooling and/or purifying the feed air with chilled water, air turbines, $CO_2$ absorbers, etc., and various heat exchange and cold recovery means commonly associated with a fractionation system such as a conventional double fractionation column having a high pressure air feed section and a low pressure $N_2$—$O_2$ fractionation section, which may be designed and operated in any suitable manner known to those skilled in the art and not requiring a more detailed description for a proper understanding of the present invention.

In operation, an amount of 100 mols of air is supplied through line 1 at a pressure of about 4–6 atms. gauge. The air stream in line 1 is split into a major portion of, say 78 mols supplied alternately through line 3 or line 4 and reversing valve 5 to ribbon packed regenerators 10 or 12 and a minor portion, 22 mols, supplied through lines 6 or 7 and reversing valve 8 to either of the two paths 31 and 32 in extended surface exchanger 30, depending on the cycle in which the exchanger is used. Prior to the passage of air through ribbon packed regenerators 10 or 12, the ribbon packing of the respective regenerator has been chilled to a cold end temperature of about $-280°$ F. and freed of previously deposited $CO_2$ and ice by passing about 79.5 mols of product nitrogen having a temperature of about $-294°$ F. over the packing. This nitrogen may be supplied from the top of the low pressure section 13 of a conventional double fractionation tower 14, through line 15 via lines 17 or 18 and reversing valve 19 after conventional heat exchange with other process streams. Air chilled by the precooled packing of regenerators 10 or 12 is withdrawn through lines 20 or 21 respectively and reversing valve 22, and may be passed through line 23 at a temperature of about $-278°$ F. to the high pressure feed section 16 of the fractionation tower. Product nitrogen carrying evaporated $CO_2$ and $H_2O$ is withdrawn from regenerators 10 or 12 through lines 23 or 24 respectively and reversing valve 25.

The cold end of the extended cooling surfaces of exchanger 30 is kept at a temperature of about $-280°$ F. The surfaces are freed of deposited $CO_2$ and ice, prior to their respective use for air chilling by switching passages between air feed and oxygen product. For this purpose, product oxygen gas is passed from the bottom of the low pressure fractionating tower 13, after heat exchange with other process streams if desired, continuously through line 26 at a temperature of about $-288°$ F. to flow path 31 or 32 of the extended surface exchanger 30 through lines 27 or 28 respectively and valve 29, as illustrated by the drawing. The total quantity of gas flowing through line 26 amounts to about 20.25 mols containing 95% oxygen at the conditions specified for the present example. This oxygen is passed, for example, from line 26 through line 27 using flow path 31 of the extended surface exchanger through which 22 mols of air have previously been flowing and which contains deposited $H_2O$ and $CO_2$. Product oxygen containing evaporated $CO_2$ and $H_2O$ is recovered through line 33, or through line 34 when the flow paths are switched. Assuming an air feed temperature of about 80° F., the product nitrogen and oxygen streams withdrawn through lines 23 or 24 and 33 or 34 respectively, may have a temperature of about 72° F. and atmospheric pressure. The air cooled in exchanger 30, leaves through line 35 or 36 at a temperature of —278° F. and is combined in line 23 with the air leaving regenerators 10 or 12.

The unbalance for the system is provided as follows. A high pressure stream of cold gaseous $N_2$ is withdrawn from the top of the high pressure fractionation tower 16, at a temperature of about —237° F. in an amount of about 28-30 mols and is supplied to line 38. A portion of this stream, say about 14 mols, is continuously passed via line 39 through a separate unbalance conduit path 40 which is in thermal bond with the switching oxygen-air passages of exchanger 30. This continuous nitrogen stream has the purpose of adjusting the heat balance within the extended surface exchanger without an undesirably large temperature differential between incoming air and outgoing oxygen at the warm end of the exchanger and also to provide the unbalance characteristic of the system required to permit complete removal of ice and $CO_2$ deposits. The internal unbalance nitrogen stream is withdrawn from conduit 40 at an intermediate section of the exchanger through line 41, at a temperature of, say, about —233° F. The nitrogen in line 41 is then combined with the remainder of the nitrogen from line 38, flowing through line 42, at a rate controlled by valve 44, and the mixture in the line 43 is expanded in a centrifugal expander 45 to provide the refrigeration requirements of the plant. The nitrogen leaving expander 45 through line 46 is combined with the nitrogen leaving the low pressure tower, further heat-exchanged in equipment not shown and supplied to line 15 to be further handled as described above.

A detail of exchanger 30 at a level $a \ldots a$, showing one arrangement by which the internal unbalance conduit may be arranged in thermal bond with the switching air-oxygen passages, is shown diagrammatically in Figure II. Shell 60 is the outer wall of an exchanger unit, shown as hexagonal in cross section to permit hexagonal nesting of multiple units. Within this shell are two concentric tubes 61 and 62. The space between shell 60 and tube 61 represents exchanger passage 32, the space between tubes 61 and 62 represents exchanger passage 31, and the space within tube 62 represents exchanger passage 40. Tube 62 is shown as having fins to provide an extended heat exchange surface, and similar arrangements may be on either or both the inner and outer surfaces of tube 61, if desired. The free cross-sectional area of passages 31 and 32 is the same. Tubes 62 and exchanger path 40 may terminate partway along the length of exchanger 30, as shown in Fig. I. It will be understood, however, that the same effect may be realized by arranging two exchanger units in series, the first of which has the three parallel flow paths bounded by surfaces 60, 61, and 62 as shown in Figure II or the lower part of Figure I, while the second omits tube 62 and has only the flow paths or passages 31 and 32 as shown diagrammatically in the upper part of Figure I.

The unbalancing method illustrated in Figure I above involves the expansion of a high pressure nitrogen stream to provide the refrigeration requirements of the system. The temperature at which this high pressure nitrogen stream is available is so low that undesired liquefaction would occur upon expansion in an expansion machine. This disadvantage is here avoided because the high pressure nitrogen stream used in conduit 40 to provide the unbalance of the system is warmed up on its course through conduit 40 in heat exchange with the gases flowing in exchanger 30. As a result the high pressure nitrogen leaving unbalance conduit 40 through line 41 has a temperature about 54° F. higher than that of the nitrogen entering conduit 40 and the warmed up nitrogen may be mixed with high pressure nitrogen which has an undesirably low temperature to establish a mixture temperature of about —260° in line 43, suitable for subsequent expansion without undesirable liquefaction.

The invention is not limited to the use of product nitrogen for establishing the unbalance in exchanger 30. For example, instead of using cold high pressure nitrogen from line 38, cold high pressure air leaving regenerators 10 or 12 and/or exchanger 30 may be supplied through line 38A in the required amount to conduit 40. When so operating, the air passing through line 41 will be too warm for an efficient refrigeration effect obtained by expansion. Therefore it is desirable to cool this air, as outlined above, before it is expanded in work engine 45. The chilled air leaving the expander is then passed through line 46A to a suitable location such as an intermediate level in the low pressure section 13 of fractionating tower 14.

In a preferred modification shown in Figure III, when using cold high pressure air for the internal unbalance stream 40, the warmed air stream leaving line 41 is cooled in auxiliary exchanger 44, by heat exchange with cold low pressure product nitrogen supplied through line 47 to adjust its temperature to a level suitable for the desired refrigeration effect by expansion.

In Fig. I, and in the modification shown in Fig. III, a high pressure cold gas stream (38 or 38a) is used for the internal unbalance, and then work expanded, after warming, to provide refrigeration to the system. In another modification of the invention, illustrated diagrammatically in Fig. IV, a cold pressure gas, product oxygen, may be supplied from line 26 in the required amount to conduit 39A to provide the unbalance of exchanger 30. In this drawing, as in Figure III, showing only the pertinent portions of Fig. I, similar parts are similarly numbered. The oxygen used thus as the unbalance stream is rejoined thereafter, by way of line 41A, with the oxygen passing directly through exchanger 30 by way of lines 27 or 28. However, before recombining these oxygen streams it is necessary to reduce the temperature of the oxygen stream used for unbalance, in order to arrive at the desired cold end temperatures and temperature differentials of exchanger 30. For this purpose, the unbalance oxygen stream leaving conduit 40 through line 41 may be heat exchanged in exchanger 44A with any suitable cold process gas stream, for example with a portion of the chilled high pressure air stream in line 23 and line 38A, or a cold high pressure product nitrogen stream in line 38. After heat exchange these high pressure gas streams, in line 43A, have a temperature suitable for cold generation by expansion to provide the refrigeration requirements of the plant.

The savings in investment cost when using a system of the type described with reference to the drawing may be of the order of 25% when compared with all ribbon packed regenerators with external unbalance and may be as high as 40% when compared with extended surface exchangers employing internal unbalance.

The above description and exemplary operations have served to illustrate specific embodiments of the invention but are not intended to be limiting in scope.

What is claimed is:

1. The method of separating gas mixtures by liquefaction and fractionation which comprises charging the major proportion of a gas mixture to be separated at operating pressure to cold regenerators operated in alternating cycles of cold storing-cleansing and gas mixture chilling-purifying, a stream of cold product gas being used for the purpose of storing cold in the regenerators and cleansing therefrom solidified deposits laid down during the gas chilling-purifying stage of the cycle, the quantity of said product gas stream being larger than the quantity of said major proportion, simultaneously charging the remaining minor proportion of said gas mixture through extended-surface heat exchanging means in heat exchange with both a second stream of cold product gas and a third cold gas stream, the quantity of said second product gas stream being less than the quantity of said minor proportion, exchanging the path of said minor proportion and said second product gas stream at intervals, passing said third gas stream continuously over a single path in heat exchange with the colder portion of said heat exchanging means, warming and withdrawing said third gas stream from said path at a temperature level below that of the warmer portion of said heat exchanging means, withdrawing chilled purified gas mixture from said regenerators, withdrawing chilled purified gas mixture from said heat exchanging means, fractionating said withdrawn chilled gas mixtures to produce separated product gas streams and withdrawing separated product gas streams from said regenerators and said heat exchanging means.

2. The process of claim 1 in which said minor proportion is about 20-25%.

3. The process of claim 1 in which said gas mixture is air, said minor proportion is about 20-25% and said third gas stream is a product gas.

4. The process of claim 3 in which said third gas stream is cold product oxygen.

5. The process of claim 4 in which the temperature of said warmed third gas stream is substantially reduced and the thus cooled stream is combined with said second product gas stream and passed in combination therewith in heat exchange with said minor portion.

6. The process of claim 1 in which said gas mixture is air and said third cold gas stream is cold product nitrogen.

7. The process of claim 6 in which said third cold gas stream is under a pressure approximating that of said gas mixture, the temperature of said warmed third gas stream is substantially reduced, and the stream thus cooled is expanded to produce refrigeration.

8. The process of claim 7 in which said cooling is accomplished by mixing said warmed third gas stream with cold product nitrogen.

9. The process of claim 1 in which said gas mixture is air under pressure and said third cold gas stream is chilled air under pressure.

10. The process of claim 9 in which the temperature of said warmed third gas stream is substantially reduced and the thus cooled stream is expanded to produce refrigeration.

11. The process of claim 10 in which said temperature reduction takes place in heat exchange with cold product gases.

12. In the separation of gas mixtures by liquefaction and fractionation, the method of controlling the carrying capacity of product gases for solidified constituents removed from the charged gas mixture on initial chilling which comprises charging the major proportion of the gas mixture to be separated at operating pressures to cold regenerators operated in alternating gas chilling and cold storing-cleansing cycles, supplying during the cold storing-cleansing stage of the cycle a quantity of cold product gas larger than the quantity of said major proportion and adjusting the excess of said quantity to provide sufficient carrying capacity to sublime out of the regenerator solidified constituents deposited therein from said larger proportion during the equivalent period of gas-chilling operation, simultaneously charging the remaining minor proportion of said gas mixture through separate extended-surface heat exchanging means in heat exchange with both a second stream of cold product gas and a third cold gas stream, the quantity of said second gas stream being less than the quantity of said minor proportion, exchanging the path of said minor proportion and said second product gas stream at intervals, passing said third gas stream continuously over a single path in heat exchange with said heat exchanging means, warming and withdrawing said third gas stream from said path at a temperature level below that of the warmer portion of said heat exchange means, adjusting the carrying capacity of said second product gas stream by adjusting its temperature in the cooler portion of said heat exchange means to approach the temperature of said minor proportion in heat exchange therewith, by adjusting the quantity of said third cold gas stream.

13. The method according to claim 12 in which said warmed third gas stream is subsequently work-expanded to produce refrigeration for the process.

14. The method according to claim 12 in which said gas mixture is air and said warmed third gas stream is product oxygen at substantially atmospheric pressure, said warmed oxygen stream is subsequently re-chilled by separate heat exchange with a cold gas stream at superatmospheric pressure, and the gas stream warmed by this heat exchange is then work-expanded to produce refrigeration for the process.

WALTER G. SCHARMANN.

References Cited in the file of this patent

UNITED STATES PATENTS

| Number | Name | Date |
|---|---|---|
| 1,539,450 | Wilkinson | May 26, 1925 |
| 2,048,076 | Linde | July 21, 1936 |
| 2,433,604 | Dennis | Dec. 30, 1947 |
| 2,460,859 | Trumpler | Feb. 8, 1949 |
| 2,504,051 | Schiebel | Apr. 11, 1950 |
| 2,513,306 | Garbo | July 4, 1950 |
| 2,537,044 | Garbo | Jan. 9, 1951 |
| 2,579,498 | Jenny | Dec. 25, 1951 |
| 2,584,985 | Cicalese | Feb. 12, 1952 |
| 2,586,811 | Garbo | Feb. 26, 1952 |
| 2,619,810 | Rice et al. | Dec. 2, 1952 |
| 2,626,510 | Schilling | Jan. 27, 1953 |

OTHER REFERENCES

Large Scale Production of Oxygen, Fiat Final Report 1120, PB 88840, May 14, 1947, by L. E. Carlsmith.